Sept. 9, 1947.   N. WAINWRIGHT ET AL   2,427,333
PISTON RING
Filed Nov. 20, 1943

INVENTOR.
NELSON WAINWRIGHT
AND ARDEN J. MUMMERT
BY
ATTORNEYS

UNITED STATES PATENT OFFICE 2,427,333

PISTON RING

Nelson Wainwright and Arden J. Mummert, St. Louis, Mo., assignors to McQuay-Norris Manufacturing Company, St. Louis, Mo., a corporation of Delaware Application November 20, 1943, Serial No. 511,080

6 Claims. (Cl. 309—44)

This invention relates generally to piston rings for internal combustion engines and particularly to piston rings which are adapted to twist when the ring is contracted from its free condition to cylinder size.

In piston rings for internal combustion engines, it has been found desirable to provide a structure of such character that, when disposed in a cylinder, the ring twists in such manner that the upper side bears against the ring groove at the outer corner while the lower inside corner of the ring bears against the lower side of the ring groove. Heretofore it has been proposed to accomplish such twisting or torsional effect in a piston ring by beveling the back thereof so as to unbalance the section of the ring.

The object of the present invention, generally stated, is to provide a piston ring and a method of making the same whereby the torsional effect may be obtained without unbalancing the cross-section of the ring.

Another object is to provide a piston ring having the torsional effect which does not require the delicate machining operations necessary in the production of torsional rings, as heretofore practiced.

Other objects will become apparent to those skilled in the art when the following description is read in connection with the accompanying drawings, in which.

Figure 1:
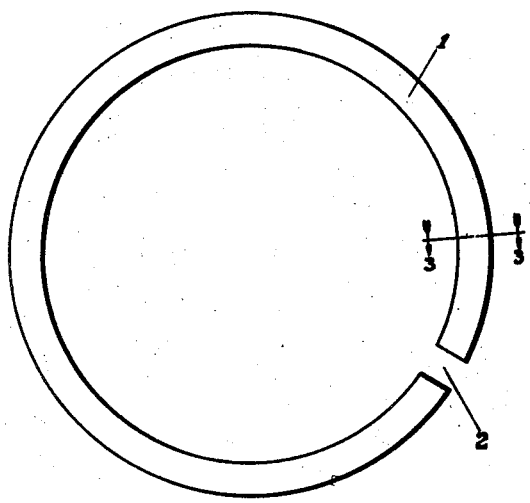
Figure 1 is a plan view of a piston ring constructed in accordance with the present invention.
Figure 2:
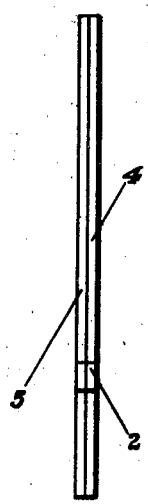
Figure 2 is a side elevation of the piston ring shown in Figure 1.
Figure 3:
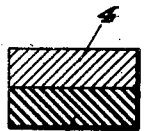
Figure 3 is a sectional view taken along line 3—3 of Figure 1.
Figure 5:
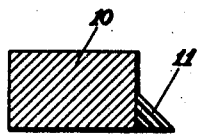
Figure 7:
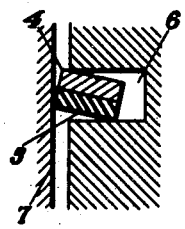
Figure 4:
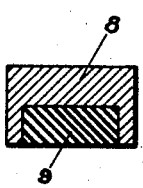
Figure 6:
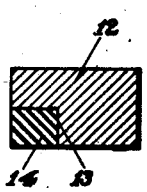

Figures 4, 5, and 6 are sectional views corresponding to Figure 3 but showing different embodiments of the invention; and Figure 7 is a sectional view showing, in exaggerated relation, the position assumed by the ring shown in the embodiments of Figures 1, 2, and 3 when arranged in a ring groove and contracted to cylinder diameter.

In accordance with the present invention, generally stated, a piston ring is constructed so as to twist itself in a ring groove in such manner that it bears against the upper side of the ring groove at the outer periphery thereof and bears against the lower side of the ring groove near the inner periphery thereof, thus assuming a canted position within the groove. In the manufacture of such rings according to the present invention, a plurality of materials is employed which differ from each other in physical properties and so reinforce each other that the lower increments of the piston ring are more resistant to radial bending than the upper increments thereof. This may be accomplished in a number of ways and, for the purpose of illustration, four different embodiments are hereinafter described in detail.

In the embodiment shown in Figures 1, 2, and 3, the piston ring 1 is of the ordinary C type having, when free and unconfined, a substantial gap 2, it being understood that when the ring is contracted to the size of the cylinder in which it is intended to operate the gap 2 is nearly closed. As is customary with C-type piston rings the ring 1, when free and unconfined, is somewhat larger than the cylinder in which it is intended to operate and departs slightly from a true circle, so that when contracted to cylinder size its configuration will approach the circular form of the cylinder. The ring 1 is composed of two laminae 4 and 5 arranged in axial alignment and permanently connected together as by means of welding, brazing, riveting or in any suitable manner. The upper lamina 4 is, however, of a material which has a lesser resistance to radial bending (such as is encountered when the piston ring is contracted from its free and unconfined condition to cylinder size) than the material of which the lower lamina 5 is formed. For example, the upper lamina 4 may be made of cast iron which has a modulus of elasticity on the order of 13–16,000,000 pounds per square inch, while the lower lamina 5 may be formed of steel having a modulus of elasticity on the order of 28–30,000,000 pounds per square inch. With such an arrangement, when the ring 1 is contracted so as to reduce the gap 2, the ring tends to twist so that the diameter across the upper side is less than the diameter across the lower side, due to the greater resistance of the lower lamina 5 to such bending. Consequently when such a ring is arranged in a ring groove 6 of a piston, as shown diagrammatically in Figure 7, the position assumed by the ring is of the character illustrated, in exaggerated relation, in such figure, and consequently the ring bears upon the cylinder wall shown diagrammatically at 7 at the lower corner of its face, and bears against the sides of the ring groove 6 near the upper-outer corner and near the lower-inner corner.

In the embodiments shown in Figures 1, 2, 3, and 7 the upper and lower laminae are of the same size and shape, but it is obvious that such uniformity is not essential to produce the torsional effect just described. In any instance the provision of a reinforce suitably located, so as to tend to make the lower increments of the ring more resistant to radial bending, will accomplish the desired torsional effect. For example, as illustrated in Figure 4, the body 8 of the ring may be formed of cast iron, in the lower side of which is inlaid a reinforce 9 of a material, such as steel, having a greater resistance to bending than the cast iron. In this connection it is pointed out that the reinforce 9 need not have a greater resistance to radial bending than the entire body 8, but it is sufficient to employ a reinforce which has a greater resistance to radial bending per unit of cross-section than the body material has.

A further embodiment is shown in Figure 5, in which the body 10 of the ring is formed of one material and a reinforce 11, permanently connected thereto in any suitable manner, is formed of a different material so that the lower increments of the ring as a whole have a greater resistance to radial bending than the upper increments thereof. In the case of this embodiment, which represents an instance of increasing the cross-section of the entire ring, the reinforce will exert its influence to produce the torsional effect in the ring even though it has the same or slightly less resistance to bending than the material of which the body 10 is formed, but obviously it is preferable to employ a material for the reinforce 11 which has a greater resistance to radial bending than the material of which the body 10 is formed, for the reason that less of such a material is required.

In the embodiment illustrated in Figure 6 the body 12 of the ring is rabbeted to cut away one of the lower corners thereof, as shown at 13, and a reinforce 14 is inlaid and permanently connected to the body. In this case, of course, in order to achieve the torsional effect desired, the reinforce 14 is formed of a material, such as steel, having a greater resistance to radial bending than the material of which the body 12 is formed.

In each of the embodiments shown in the drawings the reinforce is arranged so that the lower increments of the ring as an entirety are more resistant to radial bending than the upper increments, as this condition accomplishes a disposition of the ring in the ring groove in a cylinder in the manner illustrated in Figure 7, which is deemed desirable by the art. As pointed out, to accomplish this the reinforce is applied to the lower portion of the ring but it is obvious that the same result may be achieved if, for example, the ring shown in Figure 4 is inverted and the body 8 thereof made of a material which is more resistant to radial bending than the insert 9. The same is true of the embodiment shown in Figure 6 wherein, if the body 12 is made, for example, of steel and the insert 14 of cast iron, inversion of the ring so that the insert is in the upper corner instead of the lower corner, as shown, would achieve a condition wherein the same torsional effect as shown in Figure 7 would be accomplished.

While the ring has been shown with a true face, it will be understood that the face may be tapered.

From the foregoing description, those skilled in the art will readily understand the operation of the invention and appreciate the advantages thereof. While a number of embodiments have been specifically disclosed for the purpose of illustrating the principle involved, it is not to be understood that the invention is limited to the particular arrangement shown. On the contrary, it is contemplated that those skilled in the art may vary, modify, and supplement the arrangement shown, as by the addition of any known piston ring expedient without departing from the spirit of this invention.

The invention having thus been described, we claim:

1. A C-type piston ring which when compressed to nearly close its gap has its external peripheral face out of parallel with its axis comprising laminae arranged axially of each other and permanently connected so as to prevent movement of one lamina relative to the other, the respective laminae having different resistance to radial bending.

2. A C-type piston ring which when compressed to nearly close its gap has its external peripheral face out of parallel with its axis comprising laminae arranged axially of each other and permanently connected so as to prevent movement of one lamina relative to the other, the respective laminae having different resistance to radial bending, the lowermost lamina having the greater resistance to radial bending.

3. A C-type piston ring which when compressed to nearly close its gap has its external peripheral face out of parallel with its axis comprising a body of one metal, and a permanently connected reinforce of metal having a greater resistance to radial bending than the body metal, said reinforce being arranged to exert its influence upon the lower increments of the piston ring.

4. A C-type piston ring which when compressed to nearly close its gap has its external peripheral face out of parallel with its axis comprising a body of one metal, and a permanently connected reinforce of different metal inlaid in its lower side, said reinforce having greater resistance to bending than the body metal.

5. A C-type piston ring which when compressed to nearly close its gap has its external peripheral face out of parallel with its axis comprising a body of one material, a reinforce permanently connected to the body at the bottom thereof, said reinforce being formed of a material having greater resistance to radial bending than the body material.

6. A C-type piston ring which when compressed to nearly close its gap has its external peripheral face out of parallel with its axis comprising a body of one material and a permanently connected insert of another material, the said materials having different resistance to radial bending and the material of greater resistance to radial bending being arranged at the bottom of the ring.

NELSON WAINWRIGHT.
ARDEN J. MUMMERT.

REFERENCES CITED

The following references are of record in the file of this patent:

UNITED STATES PATENTS

| Number | Name | Date |
|---|---|---|
| 1,919,183 | Paton | July 18, 1933 |
| 1,356,461 | Mummert | Oct. 19, 1920 |
| 2,030,927 | Marien | Feb. 18, 1936 |
| 2,221,988 | Morton | Nov. 19, 1940 |

FOREIGN PATENTS

| Number | Country | Date |
|---|---|---|
| 16,666 | Great Britain | July 21, 1913 |
| 99,174 | Sweden | July 31, 1937 |

OTHER REFERENCES

"The Magic Circle," pages 8, 9 and 10, November, 1942, published by Perfect Circle Company. (Copy in 309-44.)